(12) United States Patent
Lindstrom

(10) Patent No.: US 7,331,585 B2
(45) Date of Patent: Feb. 19, 2008

(54) MACHINING ADAPTER HAVING A COLLET AND POSITIVE AXIAL STOP

(75) Inventor: Conrad B. Lindstrom, West Bloomfield, MI (US)

(73) Assignee: Lintech, Walled Lake, MI (US)

( * ) Notice: Subject to any disclaimer, the term of this patent is extended or adjusted under 35 U.S.C. 154(b) by 98 days.

(21) Appl. No.: 11/297,977

(22) Filed: Dec. 9, 2005

(65) Prior Publication Data

US 2006/0131822 A1    Jun. 22, 2006

Related U.S. Application Data

(60) Provisional application No. 60/638,909, filed on Dec. 22, 2004.

(51) Int. Cl.
*B23B 31/19* (2006.01)
*B23B 31/20* (2006.01)

(52) U.S. Cl. .................................. 279/156; 279/141

(58) Field of Classification Search ............... 279/42, 279/52, 53, 48, 56, 141, 156; 409/232, 234
See application file for complete search history.

(56) References Cited

U.S. PATENT DOCUMENTS

| | | | | |
|---|---|---|---|---|
| 1,370,598 | A * | 3/1921 | Lapointe | 279/53 |
| 2,162,856 | A * | 6/1939 | Nitsch | 279/52 |
| 2,469,160 | A * | 5/1949 | Evans | 279/51 |
| 2,478,195 | A * | 8/1949 | Hull | 279/145 |
| 2,576,350 | A * | 11/1951 | Mazzola | 279/6 |
| 2,821,404 | A * | 1/1958 | Sloan | 279/51 |
| 2,922,656 | A * | 1/1960 | Belloli | 279/46.3 |
| 3,510,141 | A * | 5/1970 | Dunham | 279/51 |
| 3,687,468 | A * | 8/1972 | Skahen | 279/51 |
| 3,718,339 | A * | 2/1973 | Dunham et al. | 279/51 |
| 3,751,027 | A * | 8/1973 | Giles | 269/152 |
| 3,779,566 | A * | 12/1973 | Tarbox et al. | 279/156 |
| 3,791,661 | A | 2/1974 | Giles | |
| 3,876,214 | A * | 4/1975 | Blanchard | 279/156 |
| 3,880,046 | A | 4/1975 | Sessody | |
| 4,477,095 | A * | 10/1984 | Atkinson, III | 279/145 |
| 4,867,463 | A * | 9/1989 | Hopf | 279/46.7 |
| 5,050,896 | A * | 9/1991 | Peterson | 279/156 |
| 5,077,876 | A | 1/1992 | McConkey | |

(Continued)

FOREIGN PATENT DOCUMENTS

EP         834371 A1 *  4/1998
WO     WO 9408744 A1 *  4/1994

*Primary Examiner*—Monica Carter
*Assistant Examiner*—Michael W. Talbot
(74) *Attorney, Agent, or Firm*—Young Basile Hanlon MacFarlane & Helmholdt P.C.

(57) ABSTRACT

An adapter for holding a workpiece to be machined in an accurately located axial position can include a main sleeve having an interior wall defining a passage extending therethrough with at least one inner surface angled inwardly toward a centerline of the passage, a workpiece locator engageable within the passage and supporting a positive axial location stop, an axially and radially moveable collet interposed between the main sleeve and a workpiece to be processed, and a rotatable sleeve engageable with the collet for accurately locating the workpiece to be processed by radially grasping the workpiece to be processed and axially moving the workpiece into engagement with the positive axial location stop.

19 Claims, 4 Drawing Sheets

U.S. PATENT DOCUMENTS

| | | | |
|---|---|---|---|
| 5,133,566 A * | 7/1992 | Baker .......................... 279/156 |
| 5,149,111 A * | 9/1992 | Han ........................... 279/2.03 |
| 5,403,132 A * | 4/1995 | Truesdell ..................... 409/131 |
| 5,593,258 A | 1/1997 | Matsumoto et al. |
| 5,622,373 A * | 4/1997 | Tagami ......................... 279/52 |
| 5,716,173 A | 2/1998 | Matsumoto |
| 5,730,562 A | 3/1998 | Matsumoto |
| 6,105,974 A | 8/2000 | Matsumoto |
| 6,192,981 B1 | 2/2001 | Boquet et al. |
| 6,270,086 B1 * | 8/2001 | Lloyd ........................... 279/51 |
| 6,352,395 B1 | 3/2002 | Matsumoto et al. |
| 6,394,466 B1 | 5/2002 | Matsumoto et al. |
| 6,854,741 B2 * | 2/2005 | Lopez ........................... 279/52 |
| 2001/0049984 A1 | 12/2001 | Matsumoto et al. |
| 2003/0175088 A1 | 9/2003 | Matsumoto et al. |
| 2003/0228199 A1 | 12/2003 | Matsumoto et al. |
| 2004/0164502 A1 | 8/2004 | Taguchi et al. |

* cited by examiner

MACHINING ADAPTER HAVING A COLLET AND POSITIVE AXIAL STOP

RELATED APPLICATIONS

This application is a continuation, and claims benefit under 35 U.S.C. §119(e), of Application Ser. No. 60/638,909 filed Dec. 22, 2004.

FIELD OF THE INVENTION

The present invention relates to a machining adapter for holding a workpiece with respect to a machining tool, and more particularly to a machining adapter having a collet and a positive axial stop for engaging the workpiece to be machined.

BACKGROUND

Various type of machining adapters can be found in the prior art including U.S. Pat. Nos. 6,394,466; 6,352,395; 6,105,974; 5,730,562; 5,716,173; 5,593,258; U.S. Publication No. US 2004/0164502; U.S. Publication No. US 2003/0228199; U.S. Publication No. US 2003/0175088; and U.S. Publication No. US 2001/0049984. However, none of the known machining adapters can hold and accurately position an elongate workpiece axially in a mechanically simple, cost effective, and repeatable manner without costly complex mechanical construction, or costly modifications to standard machining tools.

SUMMARY

An adapter for holding a workpiece to be machined according to the present invention can include a main sleeve having an interior wall defining a passage extending therethrough with at least one inner surface angled inwardly toward a centerline of the passage, a workpiece locator engageable within the passage and supporting a positive axial location stop, an axially and radially moveable collet interposed between the main sleeve and a workpiece to be processed, and a rotatable sleeve engageable with the collet for accurately locating the workpiece to be processed by radially grasping the workpiece to be processed and axially moving the workpiece into engagement with the positive axial location stop.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
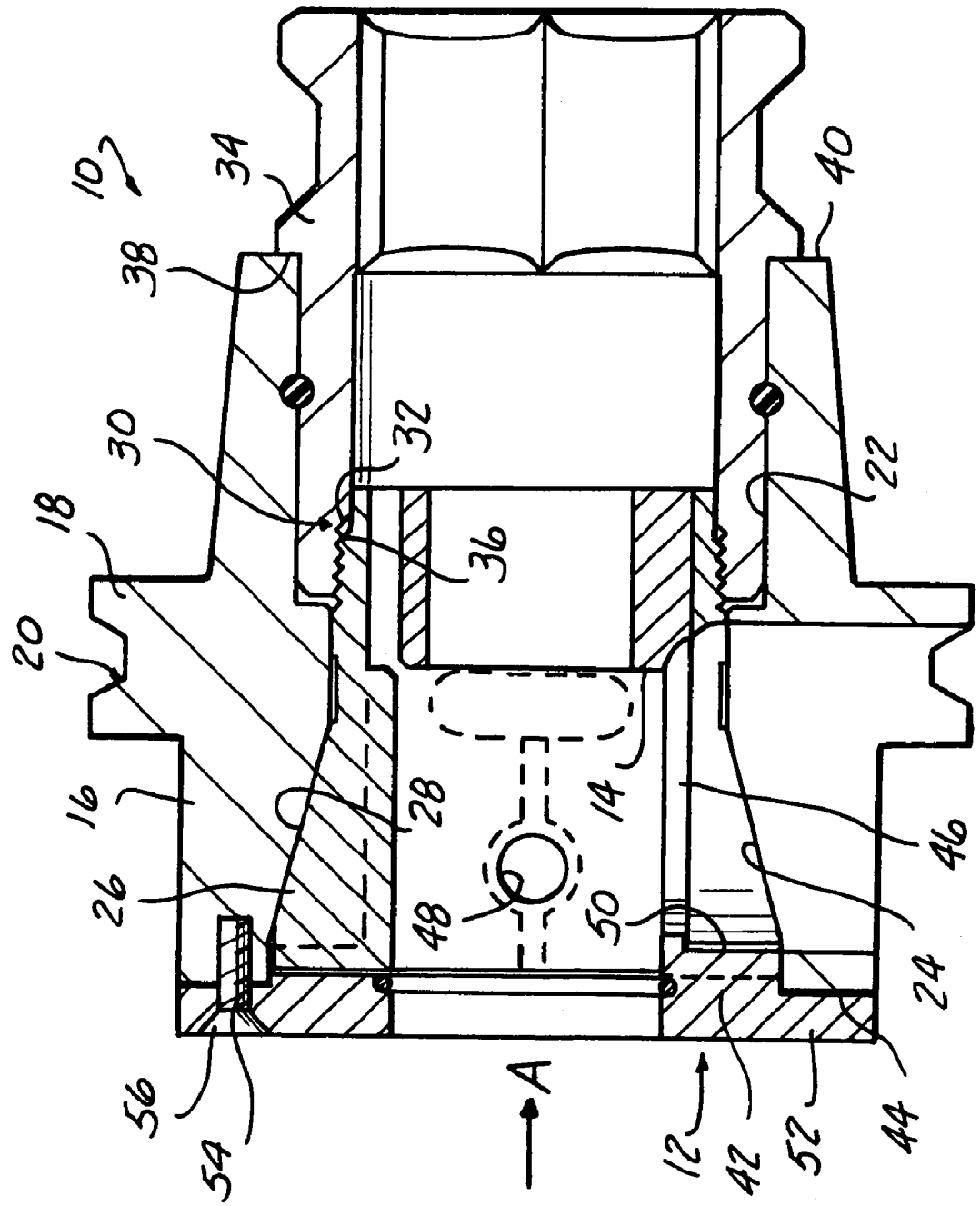
FIG. 1 is a cross-sectional view of a machining adapter according to the present invention.

Referring now to FIG. 1, a machining adapter 10 is illustrated in cross-section having a workpiece locator 12 and a positive axial location stop 14. The adapter 10 can include a main sleeve 16. The main sleeve 16 can include an outwardly extending flange 18 with a V-shaped groove 20 formed around an external periphery of the outwardly extending flange 18. The flange 18 and groove 20 can provide a surface suitable for engagement with automated tooling exchange equipment. The main sleeve 16 can also include a longitudinally extending passage 22 communicating with a tapered inwardly angled surface 24 adjacent one longitudinal end of the main sleeve 16.

Figure 2:
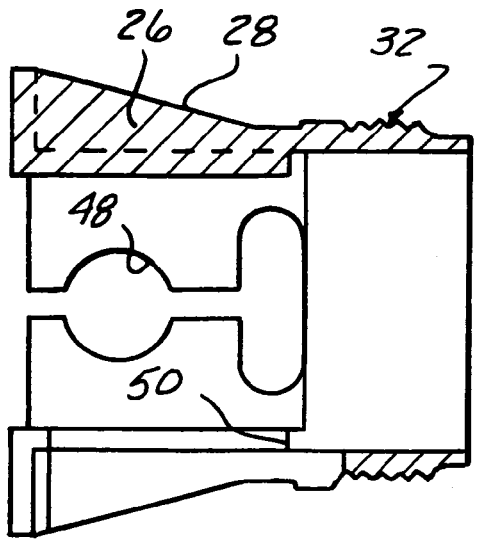
FIG. 2 is a cross-sectional detail of an axially and radially movable collet interposeable between a main sleeve inner wall for engagement with a workpiece to be processed.

As best seen in FIGS. 1 and 2, a collet 26 is engageable within the passage 22 of the main sleeve 16. The collet 26 is movable axially and radially within the passage 22 while engaging the tapered inwardly angled surface 24. As the collet 26 moves axially in one direction while engaging the tapered inwardly angled surface 24, the inner surface of the collet 26 moves radially inwardly as movement continues in the axially direction in order to operably engage the workpiece to be processed and to deliver the workpiece into engagement with the positive axial location stop 14 to accurately position the workpiece in repeatable manner with respect to the machining adapter 10. The collet 26 can include a complementary tapered inwardly angled surface 28 for engagement with the tapered inwardly angled surface 24 of the longitudinally extending passage 22 formed through the main sleeve 16. By way of example and not limitation, the collet 26 can include means for moving the collet 26 in an axial direction within the passage 22. By way of example and not limitation, the moving means 30 can include a threaded or cam surface 32.

Figure 5:
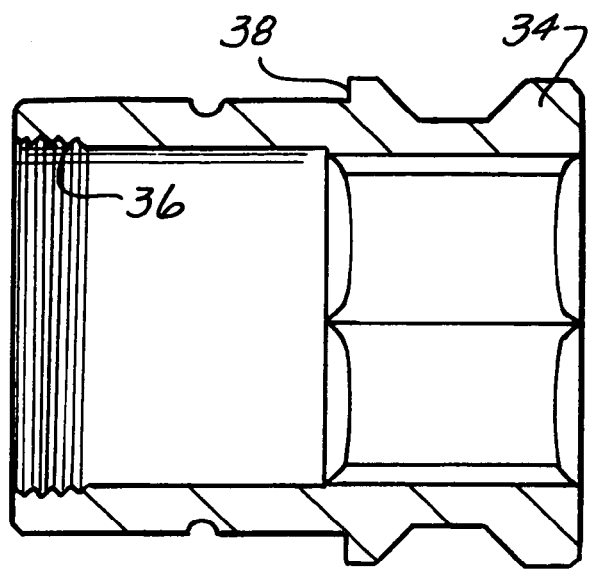
FIG. 5 is a cross-sectional view of a rotatable sleeve positionable within an longitudinal end of the main sleeve for operably engaging the collet according to the present invention.

As best seen in FIGS. 1 and 5, a rotatable sleeve can be positioned within the passage 22 of the main sleeve 16 in an end opposite from the tapered inwardly angled surface 24. The tapered inwardly angled surface 24 can include a conical surface if desired. The rotatable sleeve can include a complementary portion of the moving means 30 to operably engage the collet 26 for moving the wedge in an axial direction. By way of example and not limitation, the rotatable sleeve 34 can include complementary threaded or cam surface 36 engageable with the threaded surface 32 formed on the collet 26. Rotation of the rotatable sleeve 34 in one direction draws the collet 26 toward the rotatable sleeve, while rotation of the rotatable sleeve in an opposite direction drives the collet 26 in a direction away from the rotatable sleeve 34. Movement of the collet 26 as previously described causes operable engagement between the angled surface 28 of the collet 26 and the angled surface 24 of the main sleeve 16 in order to move the wedge radially inwardly as the collet 26 moves axially toward the rotatable sleeve 34. A shoulder 38 can be formed on the rotatable sleeve 34 to abut against a longitudinal end or shoulder 40 of the main sleeve 16. Engagement of shoulders 38, 40 maintain the rotatable sleeve 34 in position while drawing the collet 26 axially or longitudinally toward the rotatable sleeve.

Figure 3:
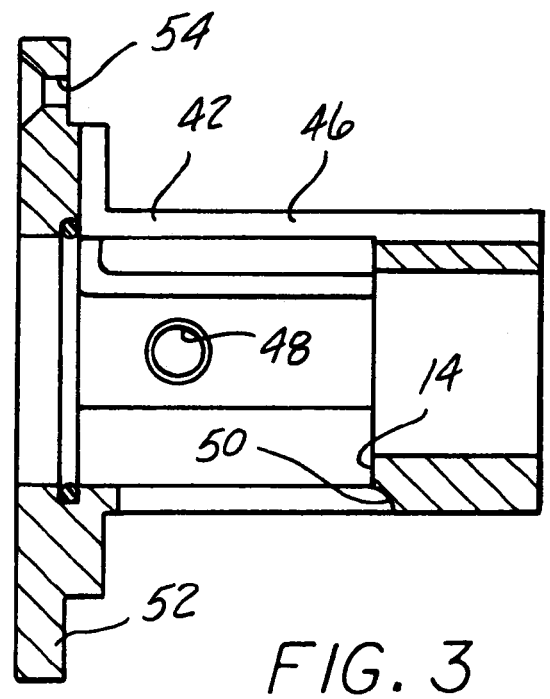
FIG. 3 is a cross-sectional view of a workpiece to be locator and a positive axial location stop for engagement with the workpiece to be processed.
Figure 4:
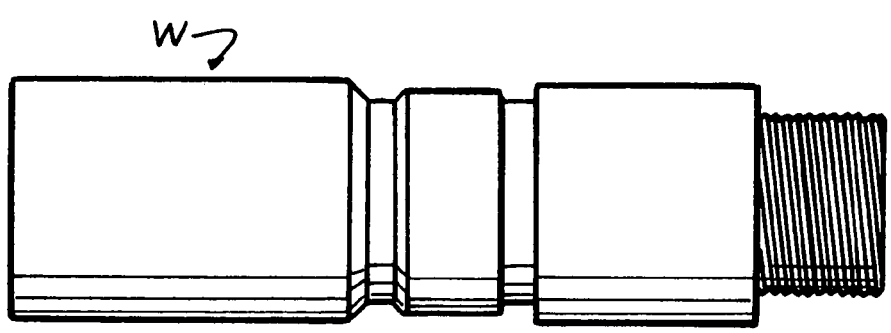
FIG. 4 is a side view of a workpiece to be processed with the machining adapter according to the present invention.

As best seen in FIGS. 1 and 3, a toilet workpiece locator 12 is connected to an opposite longitudinal end 44 of the main sleeve 16 in order to maintain the collet 26 within the passage 22 of the main sleeve 16. In addition, the toilet workpiece locator 12 can include longitudinally extending sidewall portions 46 supporting the positive axial location stop 14 in a desired fixed location with respect to the longitudinal end 44 of the main sleeve 16. This configuration permits repeatable accurate longitudinal location of a workpiece W, by way of example and not limitation, such as the workpiece W shown in FIG. 4, with respect to the machining adapter 10. Openings 48, 50 can be provided through the machining adapter 10 for access to the workpiece to be processed. By way of example, and not limitation, the machining adapter 10 according to the present invention is well adapted for holding fuel injection nozzles with respect to the machining tools required in order to form precisely located passages and connections with respect to the fuel injection nozzles. The workpiece locator 12 can include at least one longitudinally extending slot 42, allowing radial passage of the collet 26 into engagement with the workpiece W. A plurality of slots 42 can be provided spaced angularly around a periphery of the collar allowing radial through passage of a corresponding number of portions. The workpiece locator 12 can include an outwardly extending flange 52 engageable with a longitudinal end or shoulder 44 of the main sleeve 16. Apertures 54 can be provided through the flange 52 for connection with suitable fasteners 56.

Figure 6:
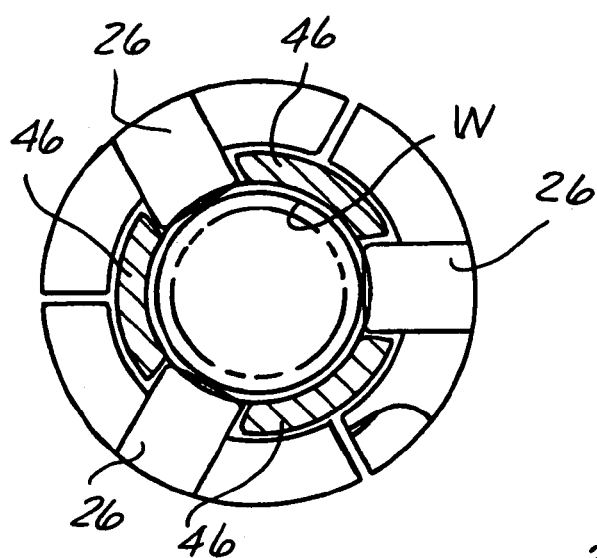
FIG. 6 is a cross-sectional view taken transverse to a longitudinal axis of a passage through the main sleeve illustrating the collet and workpiece locator configuration with the main sleeve not shown.
Figure 7:
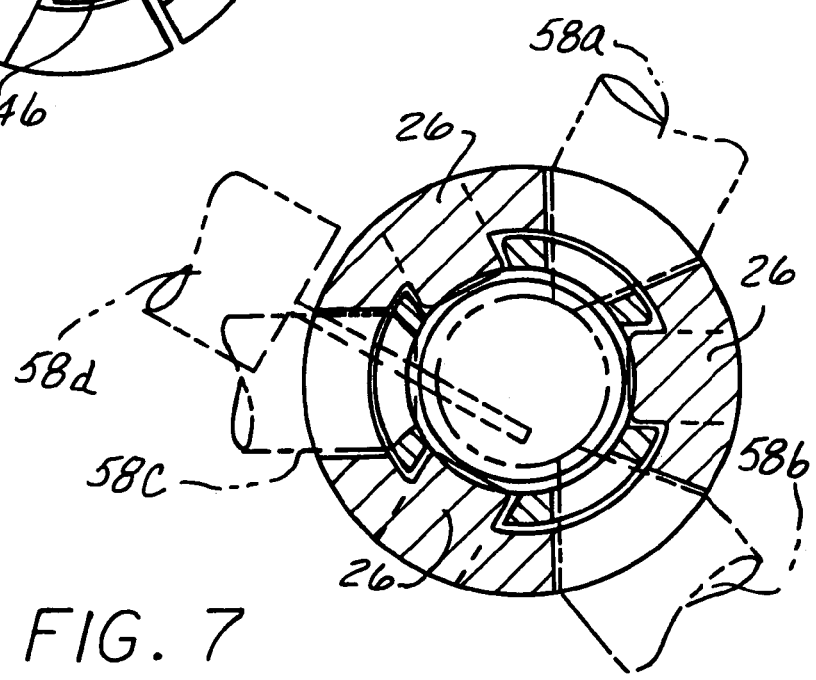
FIG. 7 is a cross-sectional view similar to that illustrated in FIG. 4 and further illustrating openings through the machining adapter allowing machining of the workpiece held within the collet against the positive axial location stop.

Referring now to FIGS. 6 and 7, the machining adapter 10 according to the present invention can include various openings or apertures 48, 50 through the main sleeve 16 allowing introduction of machining tools 58a, 58b, 58c, 58d, and allowing access for processing the workpiece W. The various tools can be used simultaneously or sequentially as desired in order to properly process the workpiece while held in an accurate axial and radial position with respect to the main sleeve 16. The workpiece W can be loaded and unloaded with respect to the machining adapter either manually or with automated equipment, if desired. The present invention provides an adapter 10 of simple construction capable of radially and axially positioning workpieces W to be processed in a repeatable position using radially and axially moveable wedges 26 allowing automated machining of each workpiece W while being held in the adapter 10.

Figure 8:
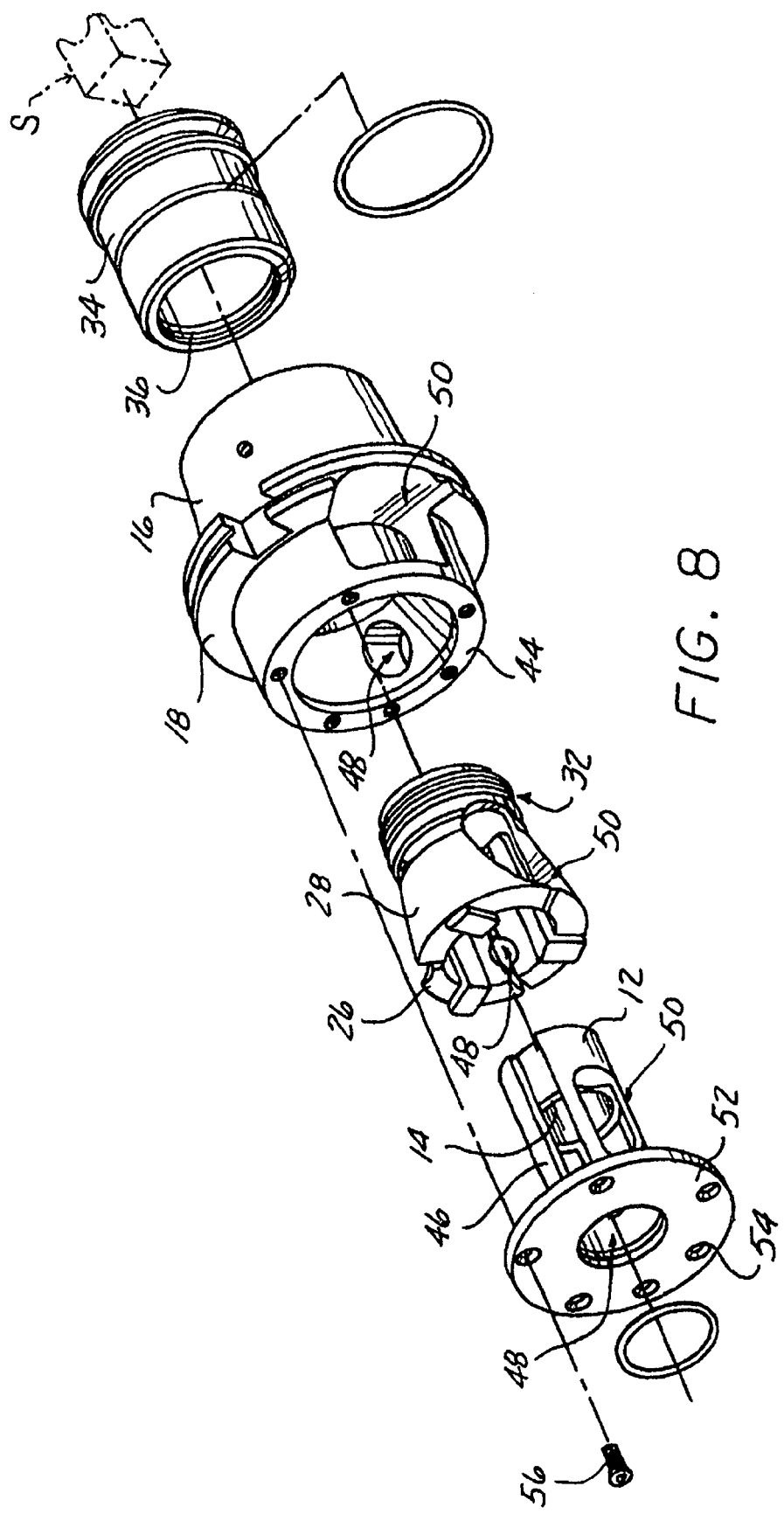
FIG. 8 is an exploded view of the machining adapter according to the present invention.

Referring now to FIG. 8, an exploded view of the present invention illustrates the assembly and operation of the apparatus. In operation, a workpiece to be processed can be inserted within the passage 22 extending through the main sleeve 16 in the direction shown by arrow A in FIG. 1. When initially positioned, the workpiece may not be completely inserted within the passage in order to engage with the positive axial location stop 14. The rotatable sleeve 34 is then rotated in the appropriate direction by machine tool drive spindle S to draw the collet 26 toward the rotatable sleeve 34. As the collet 26 moves axially toward the rotatable sleeve 34, the inner surface of the collet 26 moves radially inward as well as axially. The inner surface of the collet 26 engages the outer surface of the workpiece and draws the workpiece into engagement with the positive axial location stop 14. The workpiece is then accurately positioned for the machining operation required in order to process the workpiece. On completion of the desired processing, the rotatable sleeve 34 is rotated in the opposite direction by machine tool drive spindle S in order to drive the collet 26 in a longitudinal direction away from the rotatable sleeve 34. This motion causes the workpiece to be driven in a direction opposite from that shown by the arrow A in FIG. 1 as the inner surface of the collet 26 moves axially away from the rotatable sleeve 34 and outwardly radially. The workpiece is ten released in order to be exchanged by either manual or automated equipment for further processing.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An adapter for holding an elongate workpiece to be machined in an accurately located axial position comprising:
a main sleeve having an interior wall defining a passage extending therethrough with at least one inner surface angled inwardly toward a centerline of the passage;
an axially and radially moveable collet interposed between the main sleeve and a workpiece to be processed;
a workpiece locator engageable within the passage and supporting a stationary, positive axial location, workpiece stop, the workpiece locator including an elongate body supporting the positive axial location, workpiece stop adjacent one longitudinal end and a plurality of axially extending slots spaced angularly from one another around a periphery of the elongate body allowing radially inwardly extending passage of the axially and radially moveable collet;
a rotatable sleeve engageable with the collet for accurately locating the workpiece to be processed with respect to the main sleeve by radially grasping the workpiece to be processed and axially moving the workpiece into engagement with the stationary, positive axial location, workpiece stop; and at least one tooling access port defined by each of the main sleeve, collet and workpiece locator, wherein the at least one tooling access ports are all aligned with one another to allow machining tools to access a sheathed portion of a workpiece to be machined.

2. The adapter of claim 1 further comprising:
an outwardly extending radial flange formed on the main sleeve between opposite longitudinal ends, an outer peripheral surface of the flange including a radially inwardly extending annular groove.

3. The adapter of claim 2 further comprising:
the annular groove having a cross-section with a flat base surface and outwardly extending sidewalls angled away from one another.

4. The adapter of claim 1 further comprising:
the passage of the main sleeve including a narrowed passage extending between the at least one surface angled inwardly and an opposite longitudinal end, and an outwardly extending shoulder surface defining an enlarged diameter surface portion adjacent the opposite longitudinal end.

5. The adapter of claim 1 further comprising:
the workpiece locator including an outwardly extending flange adjacent one longitudinal end for engagement with an outer longitudinal end of the main sleeve.

6. The adapter of claim 1 further comprising:
the moveable collet having an elongate body with a central passage, a threaded portion adjacent to one longitudinal end of the body, and a plurality of inwardly facing, axially extending, workpiece-engaging surfaces spaced angularly from one another around a periphery of the elongate body, the workpiece-engaging surfaces moveable radially as the elongate body moves axially.

7. The adapter of claim 1 further comprising:
the rotatable sleeve including an elongate body with shaped surface adjacent one longitudinal end to be operably engaged with a machine tool drive spindle.

8. The adapter of claim 7 further comprising:
a threaded portion adjacent an opposite longitudinal end of the elongate body for engagement with the moveable collet.

9. An adapter for holding an elongate workpiece to be machined in an accurately located axial position comprising:
a main sleeve having an interior wall defining a passage extending therethrough with at least one inner surface angled inwardly toward a centerline of the passage;
a workpiece locator engageable within the passage and supporting a positive axial location stop, the workpiece locator including an elongate body supporting the positive axial location stop adjacent one longitudinal end and at least one axially extending slot located on a periphery of the elongate body;
an axially and radially moveable collet having an elongate body interposed between the main sleeve and a workpiece to be processed, the at least one axially extending slot through the workpiece locator allowing radially inwardly extending passage of at least one inwardly facing, axially extending, workpiece-engaging surface formed on the collet located on a periphery of the elongate body, the workpiece-engaging surface moveable radially as the elongate body of the collet moves axially; and
a rotatable sleeve engageable with the collet for accurately locating the workpiece to be processed with respect to the main sleeve by radially grasping the workpiece to be processed and axially moving the workpiece into engagement with the positive axial location stop; and at least one tooling access port defined by each of the main sleeve, collet and workpiece locator, wherein the at least one tooling access ports are all aligned with one another to allow machining tools to access a sheathed portion of a workpiece to be machined.

10. The adapter of claim 9 further comprising:
an outwardly extending radial flange formed on the main sleeve between opposite longitudinal ends, an outer peripheral surface of the flange including a radially inwardly extending annular groove.

11. The adapter of claim 10 further comprising:
the annular groove having a cross-section with a flat base surface and outwardly extending sidewalls angled away from one another.

12. The adapter of claim 9 further comprising:
the passage of the main sleeve including a narrowed passage extending between the at least one surface angled inwardly and an opposite longitudinal end, and an outwardly extending shoulder surface defining an enlarged diameter surface portion adjacent the opposite longitudinal end.

13. The adapter of claim 9 further comprising:
the workpiece locator including an elongate body supporting the positive axial location stop adjacent one longitudinal end and a plurality of axially extending slots spaced angularly from one another around a periphery of the elongate body allowing radially inwardly extending passage of the axially and radially moveable collet.

14. The adapter of claim 9 further comprising:
the workpiece locator including an outwardly extending flange adjacent one longitudinal end for engagement with an outer longitudinal end of the main sleeve.

15. The adapter of claim 9 further comprising:
the moveable collet having an elongate body with a central passage, a threaded portion adjacent to one longitudinal end of the body, and a plurality of inwardly facing, axially extending, workpiece-engaging surfaces spaced angularly from one another around a periphery of the elongate body, the workpiece-engaging surfaces moveable radially as the elongate body moves axially.

16. The adapter of claim 9 further comprising:
the rotatable sleeve including an elongate body with shaped surface adjacent one longitudinal end to be operably engaged with a machine tool drive spindle.

17. The adapter of claim 16 further comprising:
a threaded portion adjacent an opposite longitudinal end of the elongate body for engagement with the moveable collet.

18. An adapter for holding an elongate workpiece to be machined in an accurately located axial position comprising:
a main sleeve having an interior wall defining a passage extending therethrough with at least one inner surface angled inwardly toward a centerline of the passage;
a workpiece locator engageable within the passage and supporting a positive axial location stop, the workpiece locator including an elongate body supporting the positive axial location stop adjacent one longitudinal end and a plurality of axially extending slots spaced angularly around a periphery of the elongate body;
an axially and radially moveable collet having an elongate body with a central passage, a threaded portion adjacent to one longitudinal end of the body, the collet interposed between the main sleeve and a workpiece to be processed, the plurality of axially extending slots through the workpiece locator allowing radially inwardly extending passage of a corresponding plurality of inwardly facing, axially extending, workpiece-engaging surfaces formed on the collet spaced angularly around a periphery of the elongate body, the workpiece-engaging surfaces moveable radially as the elongate body of the collet moves axially; and
a rotatable sleeve engageable with the collet for accurately locating the workpiece to be processed with respect to the main sleeve by radially grasping the workpiece to be processed and axially moving the workpiece into engagement with the positive axial location stop; and at least one tooling access port defined by each the main sleeve, collet and workpiece locator, wherein the least one tooling access ports are all aligned with one another to allow machining tools to access a sheathed portion of a workpiece to be machined.

19. The adapter of claim 18 further comprising:

the rotatable sleeve including an elongate body with shaped surface adjacent one longitudinal end to be operably engaged with a machine tool drive spindle, and a threaded portion adjacent an opposite longitudinal end of the elongate body for engagement with the moveable collet.

* * * * *

UNITED STATES PATENT AND TRADEMARK OFFICE
CERTIFICATE OF CORRECTION

| | | |
|---|---|---|
| PATENT NO. | : 7,331,585 B2 | Page 1 of 1 |
| APPLICATION NO. | : 11/297977 | |
| DATED | : February 19, 2008 | |
| INVENTOR(S) | : Conrad B. Lindstorm | |

It is certified that error appears in the above-identified patent and that said Letters Patent is hereby corrected as shown below:

Title Page Item (73) (Assignee), Delete "Walled Lake," and insert -- 1929 W. Maple, Walled Lake, 48390-2953 --, therefore.
Column 1, Line 63; After "workpiece" delete "to be".
Column 3, Line 9; Before "workpiece" delete "toilet".
Column 3, Line 12; After "addition, the" delete "toilet".
Column 3, Line 32; Before "portions" insert -- wedge --.
Column 4, Line 11; Delete "ten" and insert -- then --, therefore.
Column 6, Line 64, In Claim 18, before "least" insert -- at --.

Signed and Sealed this

Tenth Day of June, 2008

JON W. DUDAS
*Director of the United States Patent and Trademark Office*